US005687809A

United States Patent [19]
Braud

[11] Patent Number: 5,687,809
[45] Date of Patent: Nov. 18, 1997

[54] LIFT TRUCK WITH TELESCOPIC ARM

[75] Inventor: Marcel Claude Braud, Champtoceaux, France

[73] Assignee: Manitou BF, Ancenis, France

[21] Appl. No.: 706,360

[22] Filed: Aug. 30, 1996

Related U.S. Application Data

[63] Continuation of Ser. No. 352,154, Dec. 1, 1994, abandoned.

[30] Foreign Application Priority Data

Dec. 1, 1993 [FR] France ................... 93 14367

[51] Int. Cl.$^6$ .................................................. B60K 5/04
[52] U.S. Cl. ................... 180/297; 180/299; 180/292; 180/306
[58] Field of Search .................................. 180/297, 299, 180/292, 245, 306

[56] References Cited

U.S. PATENT DOCUMENTS 3,401,763  9/1968  Rolt ........................ 180/292 X
3,718,265  2/1973  Trost ........................ 214/1 D
4,411,329  10/1983 Stedman ..................... 180/257 X
5,390,759  2/1995  Gollner ...................... 180/307

FOREIGN PATENT DOCUMENTS

2 650 541   2/1991   France .
2739325     3/1978   Germany .
39 14 839   11/1990  Germany .
4 276 138   10/1992  Japan .
1 354 132   5/1974   United Kingdom .
2161784     1/1986   United Kingdom .

Primary Examiner—Peter M. Poon
Attorney, Agent, or Firm—Young & Thompson

[57] ABSTRACT

A lift truck 1 with a telescopic arm 3 comprises a front axle 6 and a rear axle 7 and a mechanical transmission to transmit the movement of the drive train 5 to the forward 6 and/or rear 7 axle or axles. The drive train 5 is oriented transversely to the truck 1 and the mechanical transmission is located in a central position. This arrangement permits easy access to the drive train and rapid exchange of the latter, so as to facilitate the maintenance and reduce the down time of the lift truck.

27 Claims, 5 Drawing Sheets

LIFT TRUCK WITH TELESCOPIC ARM

This application is a continuation of application Ser. No. 08/352,154, filed Dec. 1, 1994, now abandoned.

The invention relates to a lift truck with a telescopic arm.

The invention is applicable particularly to lift trucks, whose telescopic arm is in lowered position, particularly below the line of sight of the driver, this lowered position corresponding to a 360° visibility for the driver seated in the driver's cabin.

For public works, agricultural work or other work operating continuously over long periods, the lift trucks must operate continuously for long periods, and the shut down periods for maintenance and repair of these machines must be minimized.

Given the fact that the movable members of the telescopic arm, the bearings of the rotatable members or other items requiring greasing or lubrication are at present designed to be greased or lubricated continuously during operation of the lift truck, stopping the machine is principally effected for periodic renovation, maintenance, operation or repair of the drive train.

The invention has for its object to permit easy access to the drive train and rapid exchange of the latter, so as to facilitate the maintenance and reduce the down time of the lift truck.

The invention has for its object a lift truck with a telescopic arm of the type comprising a cabin containing the driver station and a drive train, located on opposite sides of the telescopic arm, a forward axle and a rear axle and mechanical transmission means to transmit the movement of a heat engine to at least one of the two front or rear axles or to these two front and rear axles, characterized in that the mechanical transmission means comprise a gear box with a clutch, located in a central position, and in that the output shaft of the heat engine is oriented transversely relative to the truck.

According to other characteristics of the invention:
the gear box is driven by means of an angle change with two outputs, of which one drives the gear box and of which the other drives a hydraulic pump furnishing the energy to the hydraulic actuators of the truck,
mechanical transmission means are connected to the output shaft of the heat engine by means of a cardan joint,
the mechanical transmission means are fixed rigidly to the heat engine,
the heat engine is connected to the mechanical transmission means through a beam of the chassis of the truck, in which beam is provided for this purpose an opening, a groove, a cut out or similar passage,
the input shaft of the gear box is substantially coaxial to the drive shaft of the hydraulic pump supplying the hydraulic elements of the truck,
the angle change with two outputs is of the through-shaft type, at one end of which is mounted the gear box and to the other end of which is mounted the hydraulic pump of the truck,
the radiator and the fan of the drive train are mounted on the side of the heat engine,
the axis of the fan is substantially parallel to the longitudinal axis of the truck,
the fan is driven by an angle change controlled by the distribution mechanism of the motor.

The invention will be better understood from the description which follows given by way of nonlimiting example with regard to the accompanying drawings, in which.

Figure 1:
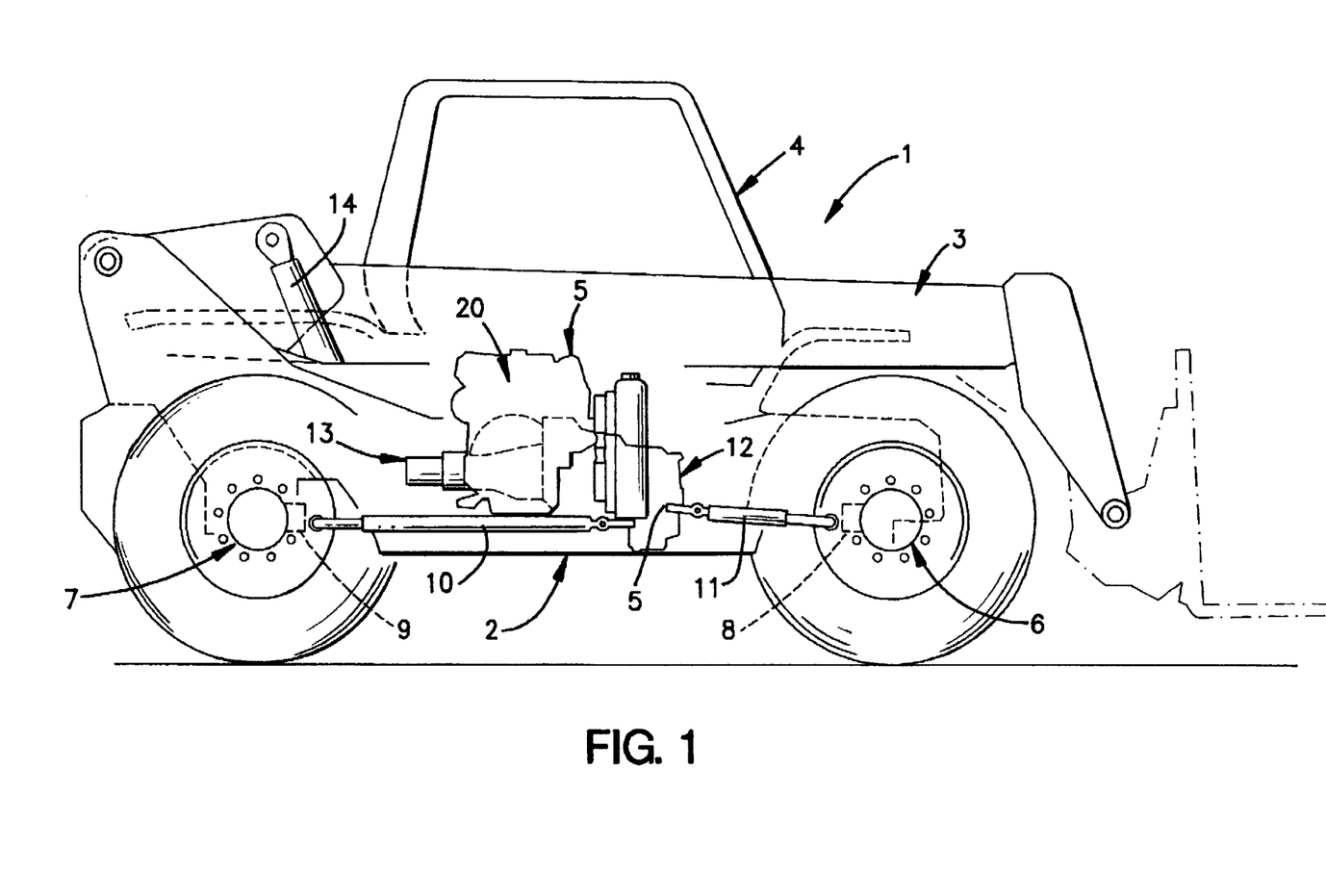
FIG. 1 shows schematically a side elevational view with parts broken away of a lift truck according to the invention.

Referring to FIG. 1, a lift truck 1 according to the invention comprises a chassis 2 comprising two beams 2a and 2b extending longitudinally on opposite sides of the longitudinal axis of symmetry of the truck, to which is articulated the rear of a telescopic arm 3, in a manner known per se.

The lift truck comprises a cabin 4 containing the driver's seat and a drive train located on opposite sides of the telescopic arm 3.

The chassis 2 is supported by a forward axle 6 and a rear axle 7, each provided with left and right wheels.

The front axle 6 is driven by a conical gear pair 8 and the rear axle 7 is also driven by a conical gear pair 9, the conical pairs 8, 9 being driven by a mechanical transmission connected to the drive train 5; in the illustrated example, the conical pairs 8, 9 are driven by the shafts 10 and 11 connected to the two outputs of the gear box 12 located in a central position substantially on the longitudinal axis of the truck.

The input shaft of the gear box 12 is mounted substantially coaxially to the drive shaft of the hydraulic pump 13 for actuating the hydraulic elements of the lift truck, such as for example the jacks 14 for raising the telescopic arm 3.

Figure 2:
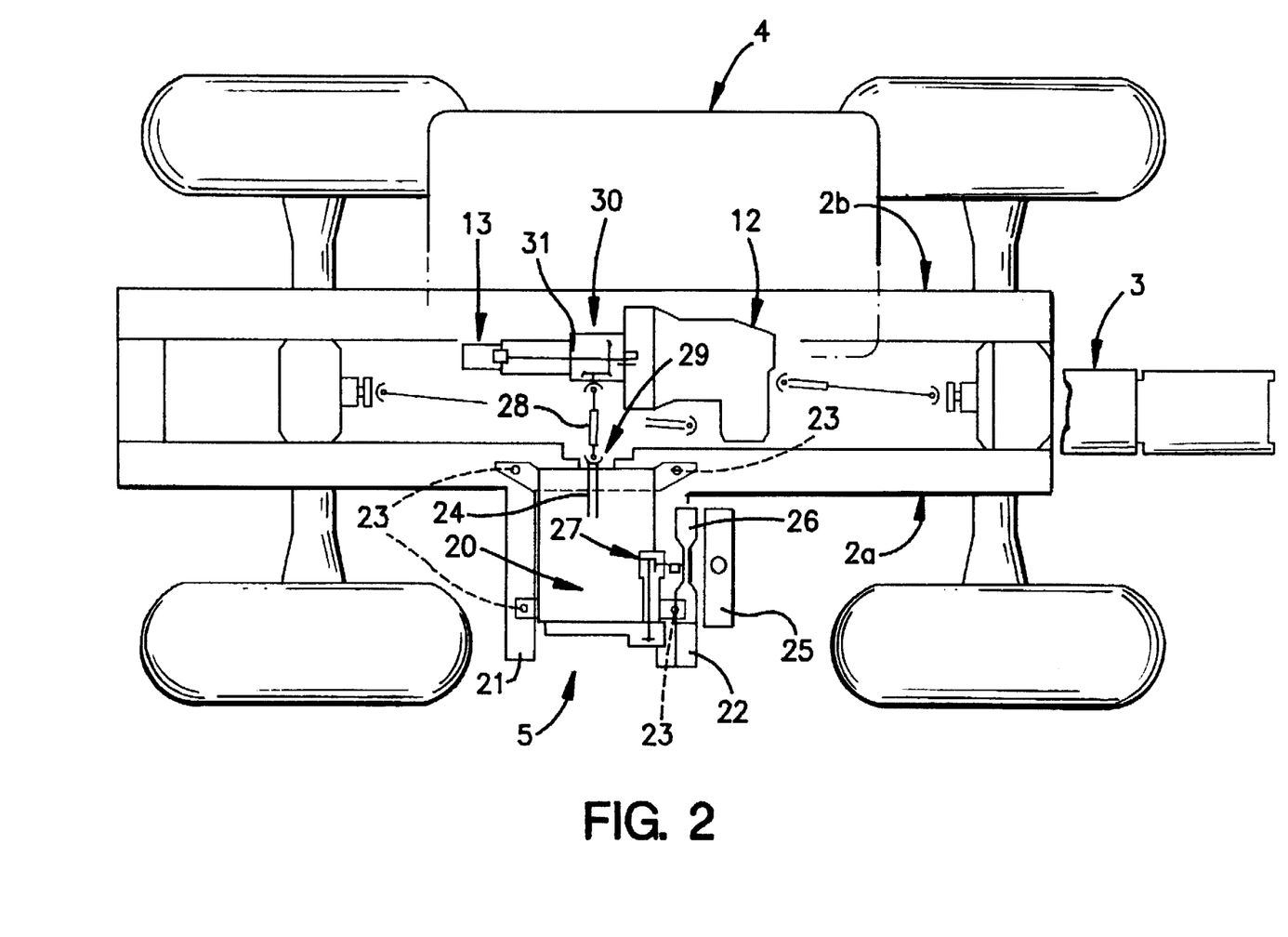
FIG. 2 shows schematically a plan view with parts broken away of a first embodiment of lift truck according to the invention.
Figure 3:
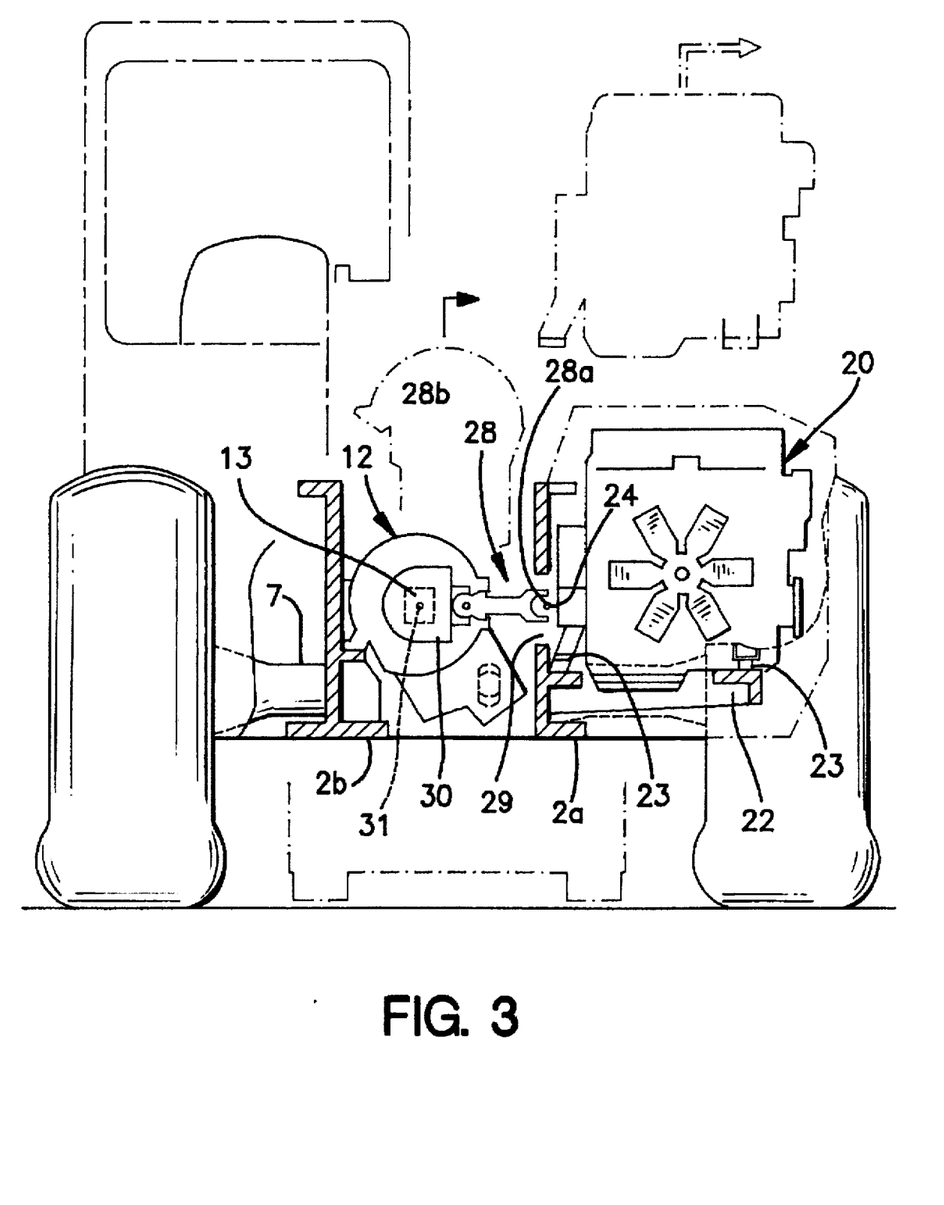
FIG. 3 shows schematically a rear elevational view with parts broken away of the lift truck of FIG. 2.

Referring to FIGS. 2 and 3, identical reference numerals to those in FIG. 1 designate identical or similar elements to those in FIG. 1.

The drive train 5 comprises a heat engine 20 supported by two cross members 21, 22 secured to the beam 2a of the chassis 2; elastic lugs 23 for isolation and suspension are preferably provided to support the heat engine 20.

The heat engine 20 thus disposed in cantilever fashion relative to the beam 2a is preferably oriented substantially transversely, which is to say its output shaft 24 is transverse to the longitudinal direction of the truck.

The heat engine 20 is of a type known per se; according to a desirable modification of the invention, the transverse size of the drive train 5 is reduced by arranging the radiator 25 and the fan 26 on the side of the engine 2C), the axis of the fan 26 being substantially parallel to the longitudinal axis of the truck. In this arrangement, the shaft of the fan 26 is driven by an additional angle change 27 controlled by the distribution mechanism of the engine 20.

The output shaft 24 of the heat engine 20 drives a cardan joint 28, of which a head 28a passes through an opening 29 provided in the beam 2a, to permit easy connection and disconnection of the cardan shaft 28.

The other end 28b of the shaft 28 drives an angle change 30 with two outputs connected respectively to the gear box 12 and the hyraulic pump 13.

Preferably, the angle change 30 is of the type comprising a common output shaft 31 for driving the hydraulic pump 13 and the gear box 12; thus, the shocks or sudden movements due to changes of speed are at least partially dampened by the hydraulic circuit under pressure of the hydraulic pump 13.

Thanks to the invention, the drive train 5 comprising the heat engine 20, the elements 25, 26, 27 added to the engine 20 and the output shaft 24 adapted to be connected to the cardan shaft 28 can be rapidly freed by ungripping the securements of the elastic lugs 23 and by disconnecting the cardan shaft 28.

By means of a suitable handling system, there is then removed the drive train 5 as schematically shown in broken lines in FIG. 3.

In this embodiment, the invention also avoids any notable transmission of vibrations between the drive train 5 mounted on the shock absorbing lugs 23 and the gear box 12 fixed rigidly to the chassis 2, because the cardan joint 28 with coaxial shafts sliding one within the other absorbs the misalignments produced by the vibrations of the engine 20 and transmits no vibration of the engine 20 to the end 28b.

In operation, the angle change 30 is continuously driven in rotation by the heat engine 20 to drive the hydraulic pump 13 or an assembly of hydraulic pumps corresponding to the different hydraulic actuators of the truck for steering the truck, the movements and the extension of the telescopic arm, the control of the brake system, particularly.

Figure 4:
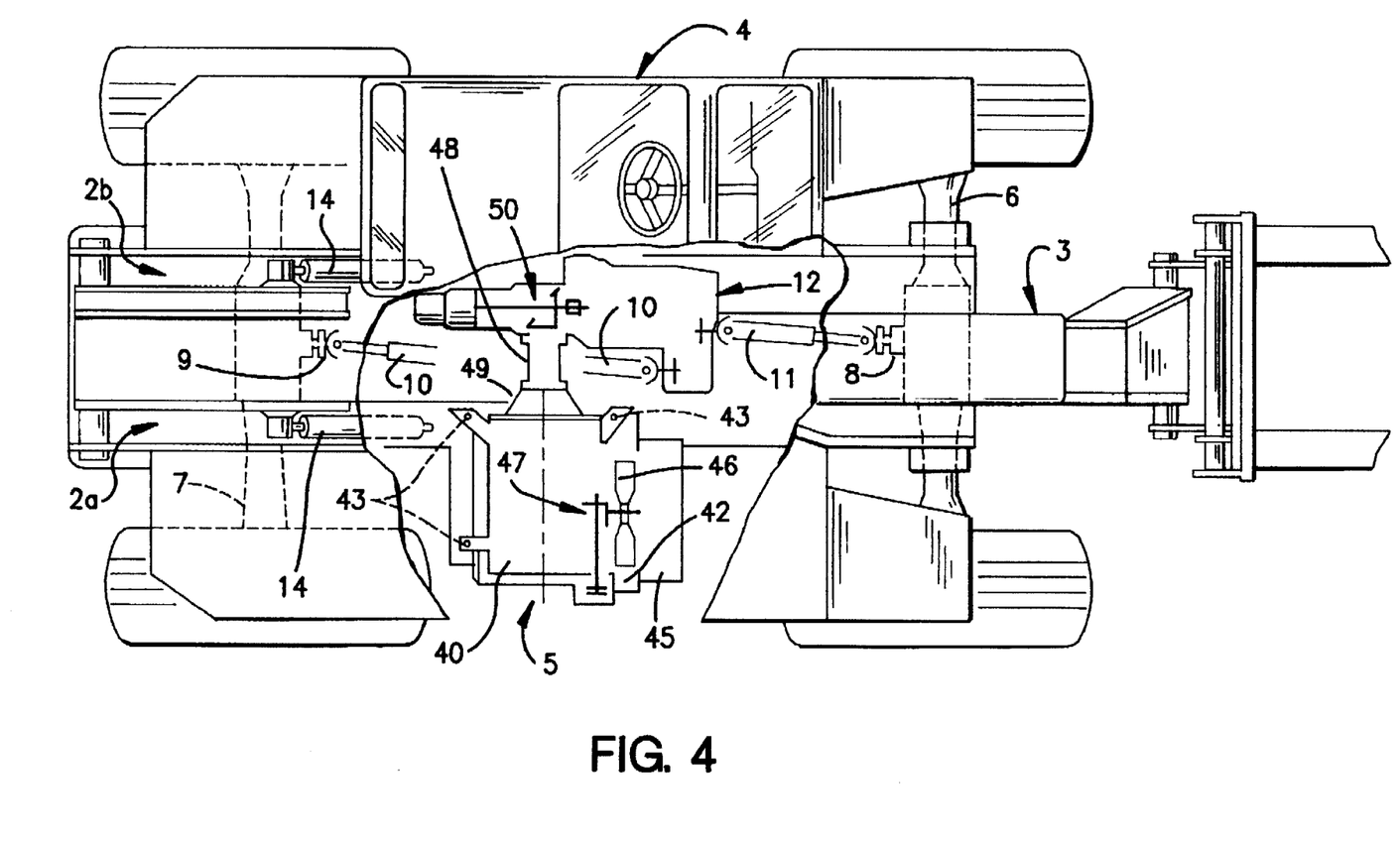
FIG. 4 shows schematically a bottom view with parts broken away of a second embodiment of lift truck according to the invention.
Figure 5:
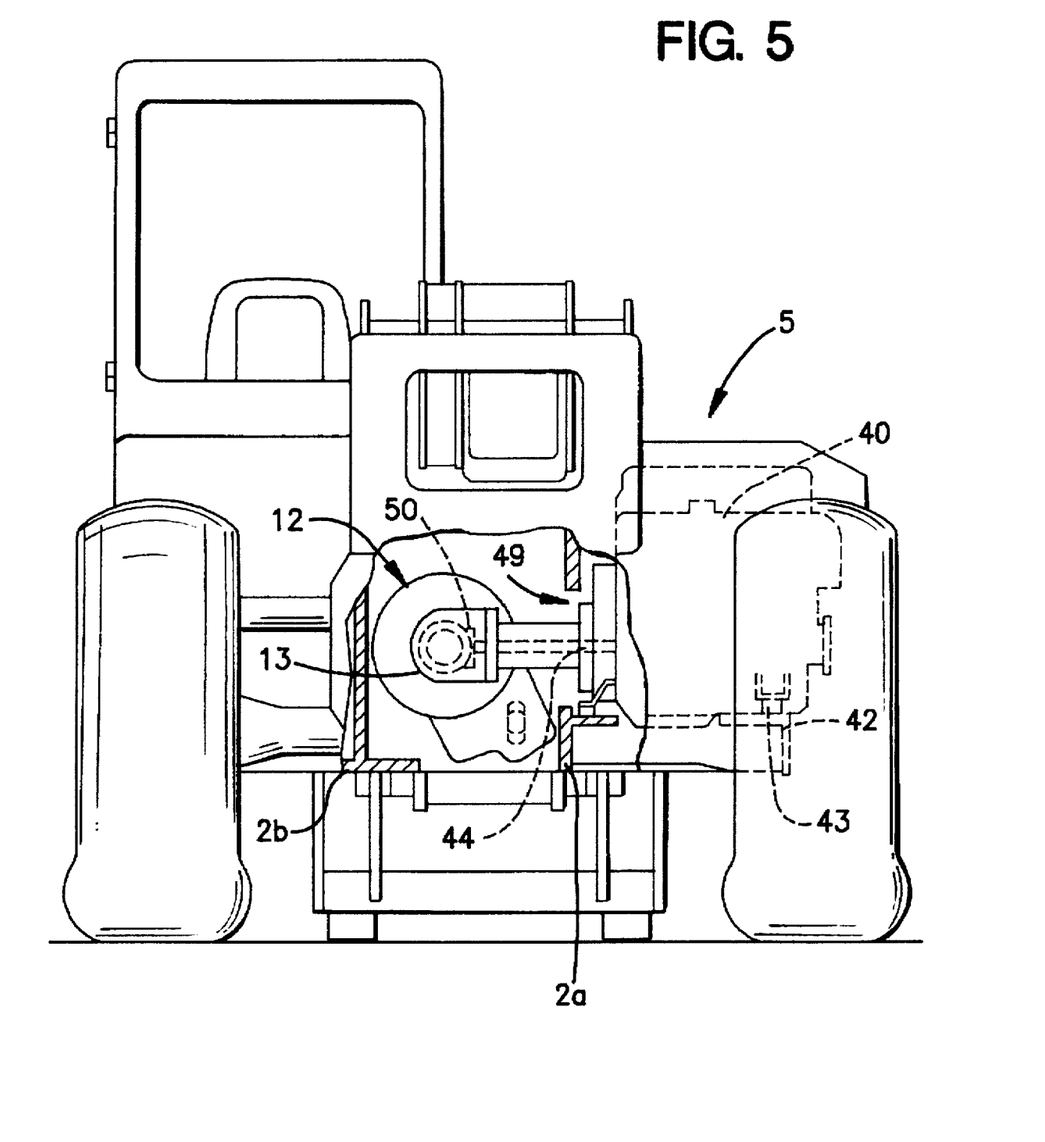
FIG. 5 shows schematically a rear view with parts broken away of the lift truck of FIG. 4.

With reference to FIGS. 4 and 5, identical reference numerals to those of FIG. 1 designate identical or similar elements to those of FIG. 1. In this embodiment, the drive train 5 comprises an engine 40 supported by two cross members 41, 42 fixed in the beam 2a of the chassis 2 by means of insulation and shock absorbing lugs 43.

The output shaft 44 being transverse to the truck, the fan 46 and the radiator 45 are mounted on one side of the motor 40. Although the fan 46 is shown as driven by the angle change 47, it will be apparent to one skilled in the art that any other manner of driving the fan 46, for example by an electric or hydraulic motor, does not depart from the scope of the present invention.

An angle change 50 having or connected to an elongated connection part 48 is connected to the drive shaft 44 of the engine 40 via a suitable groove 49 or cut out in the beam 2a. The angle change 50 is fixed rigidly to the engine 40 by a stirrup or similar disassembleable member.

The angle change 50 is continuously driven by the shaft 44 of the engine 40 and has two output shafts to drive gear box 12 and one or several hydraulic pumps 13: to this end, it is provided that the gear box 12 comprises a clutch in the two embodiments: thanks to this clutch incorporated solely at the level of the gear box 12, the hydraulic pump or pumps 13 are continuously driven as soon as the engine 40 starts.

The invention is not limited to the two embodiments disclosed, but on the contrary covers any modification of shape and any variation of embodiment within the scope and spirit of the invention.

I claim:

1. In a lift truck with a telescopic arm, comprising a cabin containing a driver's seat and a heat engine located on opposite sides of the telescopic arm; said heat engine having an output shaft oriented transversely relative to the truck and said telescopic arm being articulated at the rear of the chassis; said chassis being supported by a forward axle and a rear axle, and comprising further mechanical transmission means connected to said output shaft for transmitting the movement of said heat engine to at least one of said front and rear axles; the improvement wherein the mechanical transmission means comprises an angled transmission with at least one output for driving an input shaft of a gear box located in a central position on said lift truck, said input shaft being substantially coaxial with a drive shaft of a hydraulic pump for said lift truck.

2. A lift truck according to claim 1, wherein the mechanical transmission means are connected to said output shaft of the heat engine by means of a cardan joint.

3. A lift truck according to claim 1, wherein the mechanical transmission means are fixed rigidly to the heat engine.

4. A lift truck according to claim 1, wherein said angled transmission is provided with two outputs.

5. A lift truck according to claim 4, wherein the angled transmission with two outputs comprises a through shaft, at one end of which is mounted the gear box and at the other end of which is mounted a hydraulic pump of the truck.

6. A lift truck according to claim 1, wherein a radiator and a fan driven by the heat engine are mounted on one side of the heat engine.

7. A lift truck according to claim 6, wherein the axis of the fan is substantially parallel to the longitudinal axis of the truck.

8. A lift truck according to claim 6, wherein the fan is driven by a further angled transmission controlled by a distribution mechanism of the heat engine.

9. A lift truck according to claim 1, wherein the output shaft of the heat engine is connected to the mechanical transmission means via a beam of the chassis of the truck, said beam having a passage provided for this purpose.

10. In a lifting truck with a telescopic arm, comprising a cabin containing a driver's seat and a heat engine located on opposite sides of the telescopic arm; said heat engine having an output shaft oriented transversely relative to the truck and said telescopic arm being articulated at the rear of the chassis; said chassis being supported by a forward axle and a rear axle, and comprising further transmission means connected to said output shaft for transmitting the movement of said heat engine to at least one of said front and rear axles; the improvement wherein the transmission means are mechanical transmission means comprising a gear box, wherein said gear box is located in a central position on said lifting truck and is connected to an angled transmission, and wherein said angled transmission is connected to said output shaft of said engine by means of a cardan joint.

11. A lifting truck according to claim 10, wherein an input shaft of the gear box is substantially coaxial to a drive shaft of a hydraulic pump supplying hydraulic lifting elements of the truck.

12. A lifting truck according to claim 10, wherein said angled transmission is provided with two outputs.

13. A lifting truck according to claim 12, wherein the angled transmission with two outputs comprises a through shaft, at one end of which is mounted the gear box and at the other end of which is mounted a hydraulic pump of the truck.

14. A lifting truck according to claim 10, wherein a radiator and a fan driven by the heat engine are mounted on one side of the heat engine.

15. A lifting truck according to claim 14, wherein the axis of the fan is substantially parallel to the longitudinal axis of the truck.

16. A lifting truck according to claim 14, wherein the fan is driven by a further angled transmission controlled by a distribution mechanism of the heat engine.

17. A lifting truck according to claim 10, wherein the output shaft of the heat engine is connected to the mechanical transmission means via a beam of the chassis of the truck, said beam having a passage provided for this purpose.

18. In a lifting truck with a telescopic arm, comprising a cabin containing a driver's seat and a heat engine located on opposite sides of the telescopic arm; said heat engine having an output shaft oriented transversely relative to the truck and said telescopic arm being articulated at the rear of the chassis; said chassis being supported by a forward axle and a rear axle, and comprising further transmission means connected to said output shaft for transmitting the movement of said heat engine to at least one of said front and rear axles; the improvement wherein the transmission means are mechanical transmission means comprising a gear box, wherein said gear box is located in a central position on said lifting truck and is connected to an angled transmission, and wherein said angled transmission is connected to said output shaft of said engine by means of a driving shaft.

19. A lifting truck according to claim 18, wherein an input shaft of the gear box is substantially coaxial to a drive shaft of a hydraulic pump supplying hydraulic lifting elements of the truck.

20. A lifting truck according to claim 18, wherein said angled transmission is provided with two outputs.

21. A lifting truck according to claim 20, wherein the angled transmission with two outputs comprises a through shaft, at one end of which is mounted the gear box and at the other end of which is mounted a hydraulic pump of the truck.

22. A lifting truck according to claim 18, wherein a radiator and a fan driven by the heat engine are mounted on one side of the heat engine.

23. A lifting truck according to claim 22, wherein the axis of the fan is substantially parallel to the longitudinal axis of the truck.

24. A lifting truck according to claim 22, wherein the fan is driven by a further angled transmission controlled by a distribution mechanism of the heat engine.

25. A lifting truck according to claim 18, wherein the output shaft of the heat engine is connected to the mechanical transmission means via a beam of the chassis of the truck, said beam having a passage provided for this purpose.

26. In a lift truck with a telescopic arm, comprising a cabin containing a driver's seat and a heat engine located on opposite sides of the telescopic arm; said heat engine having an output shaft oriented transversely relative to the truck and said telescopic arm being articulated at the rear of the chassis; said chassis being supported by a forward axle and a rear axle, and comprising further mechanical transmission means connected to said output shaft for transmitting the movement of said heat engine to at least one of said front and rear axles; the improvement wherein the mechanical transmission means comprises a mechanical angled transmission with at least one output, said output driving a gear box located in a central position on said lift truck.

27. A lift truck according to claim 26, wherein the output shift of the heat engine is connected to the mechanical transmission means via a beam of the chassis of the truck, said beam having a passage provided for this purpose.

* * * * *

REEXAMINATION CERTIFICATE (3851st)

United States Patent [19]
Braud

[11] B1 5,687,809
[45] Certificate Issued Aug. 24, 1999

[54] LIFT TRUCK WITH TELESCOPIC ARM

[75] Inventor: Marcel Claude Braud, Champtoceaux, France

[73] Assignee: Manitou BF, Ancenis, France

Reexamination Request:
No. 90/005,052, Jul. 31, 1998

Reexamination Certificate for:
Patent No.: 5,687,809
Issued: Nov. 18, 1997
Appl. No.: 08/706,360
Filed: Aug. 30, 1996

Related U.S. Application Data

[63] Continuation of application No. 08/352,154, Dec. 1, 1994, abandoned.

[30] Foreign Application Priority Data

Dec. 1, 1993 [FR] France .................................. 93 14367

[51] Int. Cl.$^6$ ...................................... B60K 5/04
[52] U.S. Cl. .......................... 180/297; 180/299; 180/292; 180/306
[58] Field of Search .................................... 180/297, 299, 180/292, 245, 306

[56] References Cited

U.S. PATENT DOCUMENTS

4,805,720   2/1989   Clenet ...................................... 180/248

FOREIGN PATENT DOCUMENTS

| 2009968 | 8/1991 | Canada . |
|---|---|---|
| 0 291 336 | 11/1988 | European Pat. Off. . |
| 810619 | 3/1937 | France . |
| 1124352 | 10/1956 | France . |
| 240 869 | 11/1986 | Germany . |
| 251797 | 5/1926 | United Kingdom . |
| 2 137 145 | 10/1984 | United Kingdom . |
| WO 89/00972 | 2/1989 | WIPO . |

*Primary Examiner*—Peter M. Poon

[57] ABSTRACT

A lift truck 1 with a telescopic arm 3 comprises a front axle 6 and a rear axle 7 and a mechanical transmission to transmit the movement of the drive train 5 to the forward 6 and/or rear 7 axle or axles. The drive train 5 is oriented transversely to the truck 1 and the mechanical transmission is located in a central position. This arrangement permits easy access to the drive train and rapid exchange of the latter, so as to facilitate the maintenance and reduce the down time of the lift truck.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–27 is confirmed.

* * * * *